United States Patent
Lee et al.

(10) Patent No.: US 11,017,739 B2
(45) Date of Patent: May 25, 2021

(54) METHOD FOR SUPPORTING USER INPUT AND ELECTRONIC DEVICE SUPPORTING THE SAME

(71) Applicant: Samsung Electronics Co., Ltd., Gyeonggi-do (KR)

(72) Inventors: Jinyeong Lee, Gyeonggi-do (KR); Jaewoo Suh, Gyeonggi-do (KR); Sangim Yu, Gyeonggi-do (KR); Dongho Jang, Gyeonggi-do (KR); Yongjoon Jeon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/361,845

(22) Filed: Mar. 22, 2019

(65) Prior Publication Data

US 2019/0295498 A1    Sep. 26, 2019

(30) Foreign Application Priority Data

Mar. 23, 2018  (KR) .......................... 10-2018-0033858

(51) Int. Cl.
*G06F 3/00* (2006.01)
*G09G 5/00* (2006.01)
(Continued)

(52) U.S. Cl.
CPC ......... *G09G 5/005* (2013.01); *G06F 3/03545* (2013.01); *G06F 3/04886* (2013.01); *G06F 3/1423* (2013.01); *G09G 2354/00* (2013.01)

(58) Field of Classification Search
CPC . G09G 5/005; G06F 3/03545; G06F 3/04886; G06F 3/1423; G06F 3/0481
See application file for complete search history.

(56) References Cited

U.S. PATENT DOCUMENTS 7,131,068 B2 * 10/2006 O'Neal ................... G01N 30/56
                                                              715/730
7,401,297 B2 *  7/2008 Hori ...................... G06F 3/0481
                                                              715/781
(Continued)

FOREIGN PATENT DOCUMENTS

KR    1020150026360    3/2015
KR    1020180028855    3/2018

OTHER PUBLICATIONS

International Search Report dated Jul. 18, 2019 issued in counterpart application No. PCT/KR2019/003366, 7 pages.
(Continued)

*Primary Examiner* — Nicholas Augustine
(74) *Attorney, Agent, or Firm* — The Farrell Law Firm, P.C.

(57) ABSTRACT

An electronic device is provided. The electronic device includes housing, a touchscreen display, a wireless communication circuit, a connector, and a processor electrically connected to the touchscreen display, the wireless communication circuit, and the connector. The processor is configured to connect to an external display device via the wireless communication circuit or the connector, to display a graphical user interface corresponding to a screen, which the external display device outputs, in at least part of a region of the touchscreen display, to display at least part of a region of the graphical user interface in a black background, and to convert first coordinate information of a user input, which is received with respect to at least one region of the graphical user interface, to second coordinate information corresponding to the external display device to transmit the second coordinate information to the external display device.

20 Claims, 13 Drawing Sheets

(51) Int. Cl.
*G06F 3/0488* (2013.01)
*G06F 3/0354* (2013.01)
*G06F 3/14* (2006.01)
*G06F 3/01* (2006.01)

(56) References Cited

U.S. PATENT DOCUMENTS

| | | | | |
|---|---|---|---|---|
| 7,454,708 B2* | 11/2008 | O'Neal | ................ | G06F 3/0481 715/730 |
| 9,268,424 B2* | 2/2016 | Hatanaka | ................ | G06F 3/041 |
| 9,817,486 B2* | 11/2017 | Kwak | ................ | G06F 3/0484 |
| 9,857,935 B2 | 1/2018 | Jeong et al. | | |
| 9,870,195 B2* | 1/2018 | Dunn | ................ | G06F 3/0486 |
| 2003/0142135 A1* | 7/2003 | Hori | ................ | G09G 5/14 715/781 |
| 2005/0091610 A1* | 4/2005 | Frei | ................ | G09G 5/14 715/804 |
| 2007/0174784 A1* | 7/2007 | Yu | ................ | G06F 9/451 715/799 |
| 2010/0088639 A1* | 4/2010 | Yach | ................ | G06F 1/1626 715/825 |
| 2012/0050331 A1 | 3/2012 | Kanda | | |
| 2013/0040623 A1* | 2/2013 | Chun | ................ | H04N 21/4126 455/414.2 |
| 2013/0111371 A1* | 5/2013 | Reeves | ................ | G06F 3/0486 715/761 |
| 2014/0019520 A1* | 1/2014 | Milburn | ................ | H04L 65/4076 709/203 |
| 2015/0032686 A1* | 1/2015 | Kuchoor | ................ | G06Q 10/101 707/608 |
| 2015/0067579 A1 | 3/2015 | Jeong et al. | | |
| 2017/0115806 A1 | 4/2017 | Isobe et al. | | |
| 2017/0344333 A1 | 11/2017 | Jin et al. | | |
| 2018/0011578 A1 | 1/2018 | Choi et al. | | |
| 2018/0039382 A1 | 2/2018 | Jeong et al. | | |
| 2018/0074676 A1 | 3/2018 | Lee et al. | | |
| 2019/0098126 A1* | 3/2019 | Shuttleworth | ................ | G06F 3/017 |

OTHER PUBLICATIONS

European Search Report dated Feb. 11, 2021 issued in counterpart application No. 19771947.9-1203, 12 pages.

* cited by examiner

METHOD FOR SUPPORTING USER INPUT AND ELECTRONIC DEVICE SUPPORTING THE SAME

CROSS-REFERENCE TO RELATED APPLICATION(S)

This application is based on and claims priority under 35 U.S.C. § 119 to Korean Patent Application Serial No. 10-2018-0033858, filed on Mar. 23, 2018, in the Korean Intellectual Property Office, the entire disclosure of which is incorporated herein by reference.

BACKGROUND

1. Field

The present disclosure relates generally to a technology in which an electronic device supports a user input.

2. Description of Related Art

An electronic device may be connected to an external display device (e.g., a monitor or TV) wiredly or wirelessly to overcome the size limitation of a display. The electronic device may output content (e.g., an image or a text) of the electronic device through the connected external display device.

In an environment in which an electronic device and an external display device are connected to each other, a user may control the screen displayed on the external display device by applying a user input (e.g. touch, drag, or press using a part of a body or stylus pen) to a display of the electronic device. However, because the display size of the electronic device is different from the display size of the external display devices, a user may not intuitively recognize the corresponding display region between the electronic device and the external display device. This may interfere with clear user input on the electronic device.

SUMMARY

The present disclosure has been made to address at least the disadvantages described above and to provide at least the advantages described below.

In accordance with an aspect of the present disclosure, an electronic device is provided. The electronic device may include a housing, a touchscreen display exposed through a first region of the housing, a wireless communication circuit, an electrical connector exposed through a second region of the housing, a processor electrically connected to the touchscreen display, the wireless communication circuit, and the connector, and a memory electrically connected to the processor. The memory stores instructions, when executed by the processor, cause the electronic device to in a first operation in which the electronic device is not connected to an external display device, display a first screen including a plurality of icons associated with a plurality of application programs, on the display in a first format, and in a second operation in which the electronic device is connected to the external display device via the connector, render a second screen including the plurality of icons, in a second format, provide data associated with the second screen to the external display device via the connector such that the external display device displays the second screen, display a graphical user interface indicative of at least one object included in the second screen, on the display, receive a user input via the display, determine first coordinates of the user input, and adapt the first coordinates to the second screen so as to correspond to second coordinates corresponding to at least one region of the external display device.

In accordance with an aspect of the present disclosure, an electronic device is provided. The electronic device may include a housing, a touchscreen display, at least part of which is exposed through a first region of the housing, a wireless communication circuit, a connector, at least part of which is exposed through a second region of the housing, and a processor electrically connected to the touchscreen display, the wireless communication circuit, and the connector. The processor may be configured to connect to an external display device via the wireless communication circuit or the connector, display a graphical user interface corresponding to a screen, which the external display device outputs, in at least part of a region of the touchscreen display, display at least part of a region of the graphical user interface in a black background, and convert first coordinate information of a user input, which is received with respect to at least one region of the graphical user interface, to second coordinate information corresponding to the external display device to transmit the second coordinate information to the external display device.

In accordance with an aspect of the present disclosure, a user input supporting method of an electronic device is provided. The user input supporting method may include connecting to an external display device, displaying a graphical user interface corresponding to a screen, which the external display device outputs, in at least part of a region of touchscreen display that the electronic device includes, displaying at least part of a region of the graphical user interface in a black background, and converting first coordinate information of a user input, which is received with respect to at least one region of the graphical user interface, to second coordinate information corresponding to the external display device to transmit the second coordinate information to the external display device.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
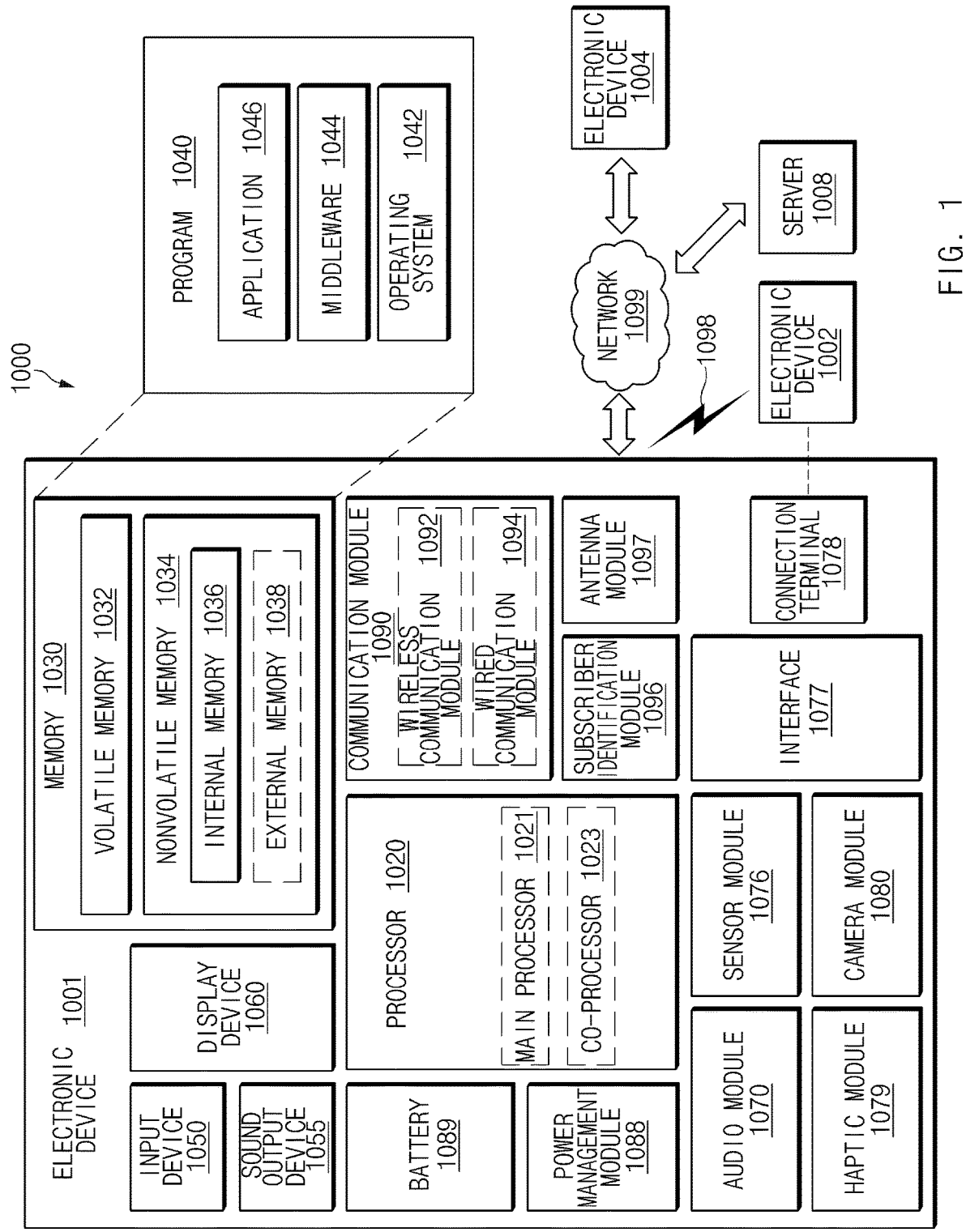
FIG. 1 is a block diagram illustrating an electronic device in a network environment according to various embodiments.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a block diagram illustrating an electronic device in a network environment according to various embodiments.

Referring to FIG. 1, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., PCB). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to" ",connected with",or connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor(e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
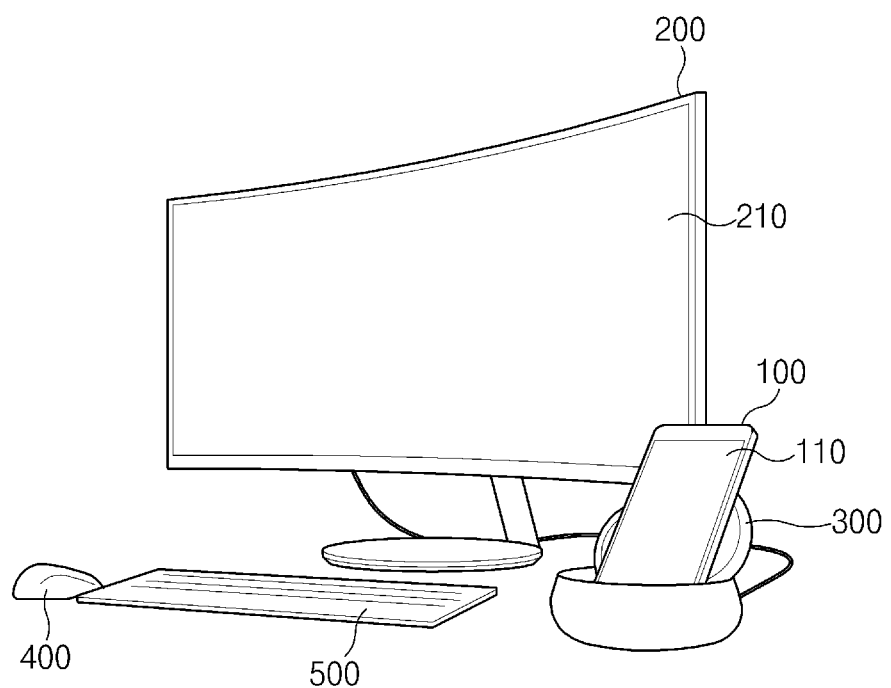
FIG. 2 is a diagram of an operating environment of an electronic device, according to an embodiment.

FIG. 2 is a diagram of an operating environment of an electronic device, according to an embodiment.

Referring to FIG. 2, an electronic device 100 (e.g., the electronic device 1001 of FIG. 1) may be electrically, communicatively, or operatively connected to at least one external device. For example, the electronic device 100 may be connected to an external display device 200 and a mediation device 300 so as to transmit or receive at least one data associated with a functional operation. In an embodiment, the size (or area) of a display 110 of the electronic device 100 may be smaller than the size (or area) of a display 210 of the external display device 200.

The mediation device 300 may connect the electronic device 100 to the external display device 200. The mediation device 300 may include, for example, a dock (or a docking station). In an embodiment, the mediation device 300 may include a mounting region for seating the electronic device 100. In this regard, the electronic device 100 may be mounted in the mounting region, in a vertical direction output mode (portrait mode) or in a horizontal direction output mode (landscape mode). In various embodiments, the electronic device 100 and the mediation device 300 may be connected through an input/output interface such as a USB port or a cable. According to an embodiment, the mediation device 300 may include at least one port for connecting to an external input device (e.g., a pointing device 400 or a keyboard device 500) wiredly. When the mediation device 300 is connected to the external input device (e.g., 400 or 500) via the port, connection information of the external input device (e.g., 400 or 500) may be provided to the electronic device 100.

The external display device 200 (e.g., a monitor, a notebook, or TV) may output at least one content (e.g., image (still image or video) or text) provided from the electronic device 100 connected via the mediation device 300. In an embodiment, the display 210 of the external display device 200 may output a screen that is at least partly different from the screen of the display 110 of the electronic device 100. In this regard, when the electronic device 100 is connected to the external display device 200, the electronic device 100 may reconfigure at least part of the content displayed on the display 110 of the electronic device 100 and may output the reconfigured screen via the external display device 200. For example, the electronic device 100 may provide a mobile desktop environment to the user of the electronic device 100 by outputting a user interface similar to the user interface of a desktop PC, via the display 210 of the external display device 200.

In an embodiment, the display 110 of the electronic device 100 may internally include a touch panel (or touch sensor) so as to receive a user input applied on the display 110. For example, the electronic device 100 may receive user input applied to the display 110, by detecting the electrical characteristic change (e.g., capacitance variation) due to at least part of the user's body performing the user input (e.g., a finger) or the stylus pen mounted in the electronic device 100. In this regard, at least part of the display 110 of the electronic device 100 may operate as an input device (e.g., touch pad) under a specified condition (e.g., whether to connect to the external display device 200 or whether to connect to an external input device (the pointing device 400)). When the display 110 of the electronic device 100 operates as an input device (e.g., a touch pad), the user input applied to the display 110 may be reflected to the movement or click of the mouse pointer or the cursor displayed on the display 210 of the external display device 200. In other words, the user input applied to the display 110 of the electronic device 100 may control the screen displayed on the external display device 200. The processing of the user input (e.g., the movement or click of the mouse pointer or the cursor) may be specified via the display 210 of the external display device 200.

According to an embodiment, in a state where the electronic device 100 is connected to the external display device 200, the electronic device 100 may output a graphical user interface, which has a shape at least partly mapped (or corresponding) to the screen of the external display device 200, on the display 110. For example, the electronic device 100 may output a graphical user interface of a shape mapped to all area or a specific area of the display 210 of the external display device 200. Because the size or area between the display 110 of the electronic device 100 and the display 210 of the external display device 200 is different from each other, the graphical user interface may function as a region guide for the user input applied to the display 110 of the electronic device 100 to control the screen output from the external display device 200.

Figure 3:
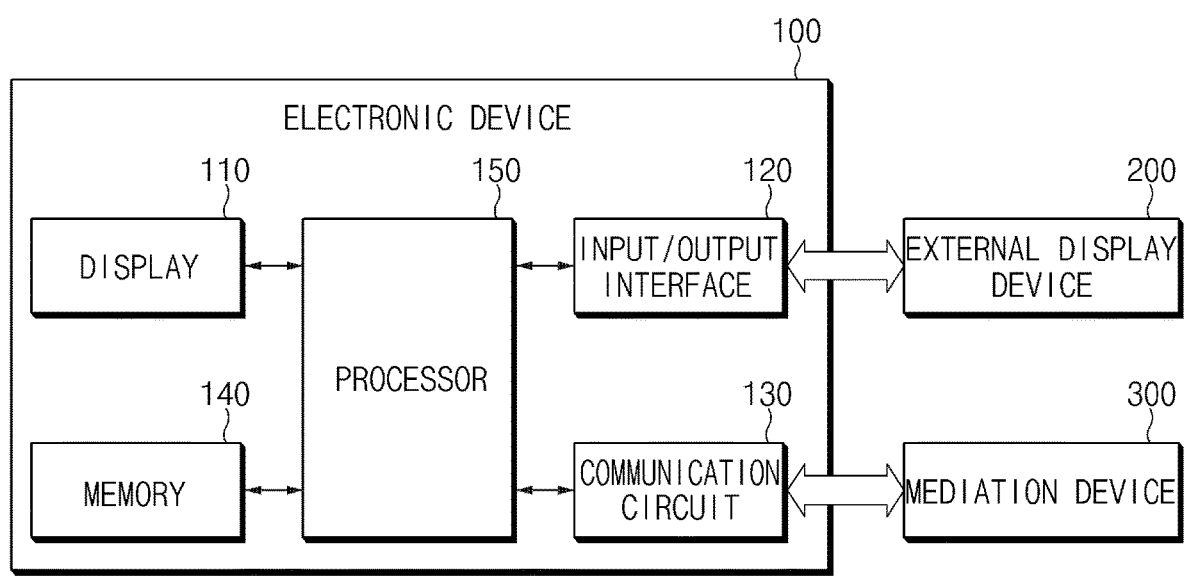
FIG. 3 is a diagram of a configuration of an electronic device, according to an embodiment.
Figure 4:
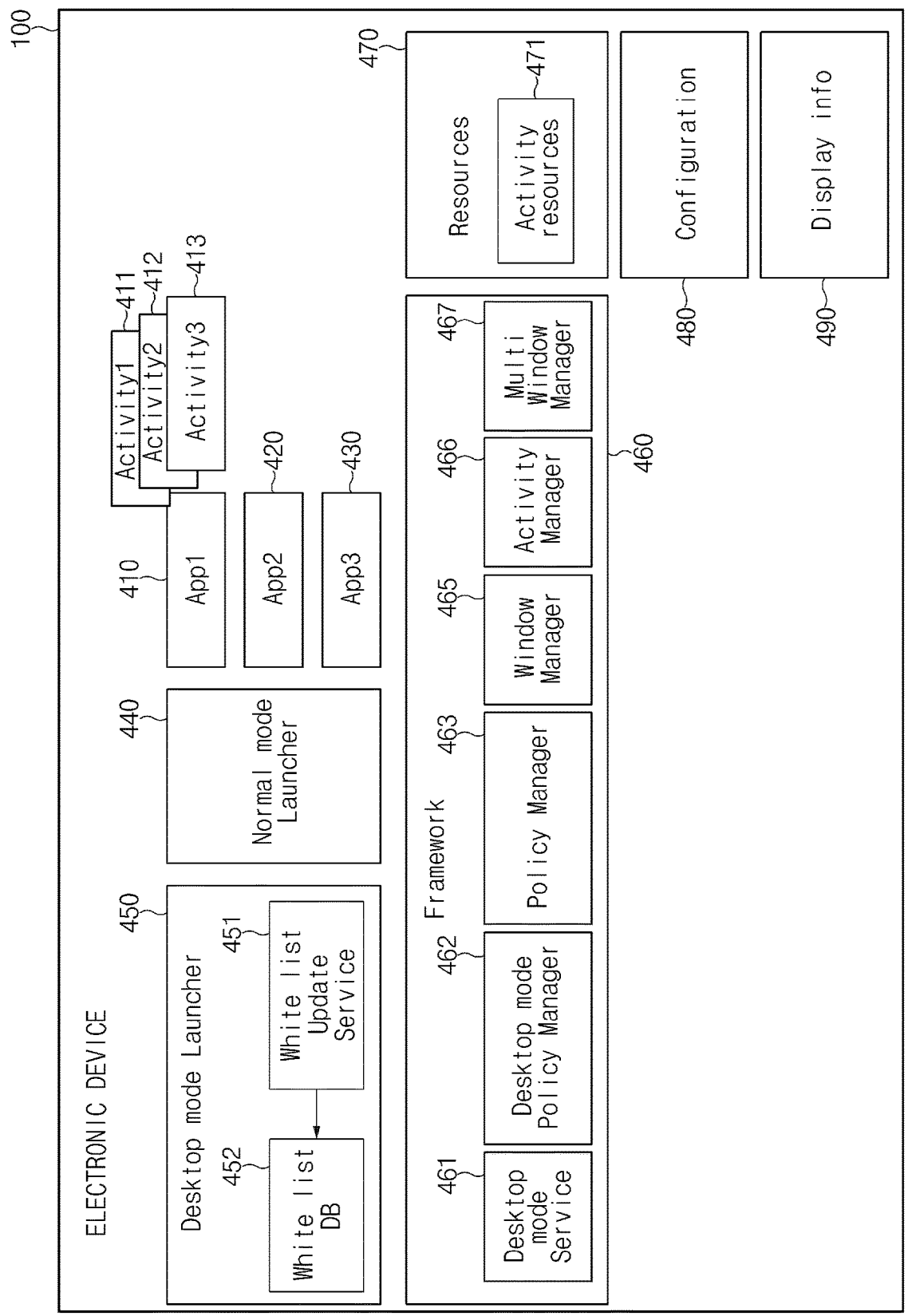
FIG. 4 is a diagram of a program included in an electronic device, according to an embodiment.

FIG. 3 is a diagram of a configuration of an electronic device, according to an embodiment. FIG. 4 is a diagram of a program included in an electronic device, according to an embodiment.

Referring to FIG. 3, the electronic device 100 (e.g., the electronic device 1001 of FIG. 1) includes the display 110, an input/output interface 120, a communication circuit (or wireless communication circuit) 130, a memory 140, and a processor 150. In various embodiments, the electronic device 100 may omit at least one of the above-described components or may further include another component. For example, the electronic device 100 may further include at least one of at least one sensor (e.g., an acceleration sensor, a gyro sensor, a proximity sensor, an illumination sensor, a fingerprint sensor, an iris sensor or a heart rate sensor) that senses the operating state or external environment of the electronic device 100 or supports user authentication, a power supply device (e.g., a battery) that supplies driving power to the above-described components, a camera that captures an image (e.g., still image or video) of the region at a periphery of the electronic device 100, or a stylus pen detachably mounted in a recess region formed in the electronic device 100. Alternatively, the electronic device 100 may further include components of the electronic device 1001 described with reference to FIG. 1. In various embodiments, the components of the electronic device 100 described above may be accommodated within a housing (not illustrated) that forms the at least part of the appearance of the electronic device 100 or at least part of the components may be exposed to the outside through one region of the housing. For example, at least part of the display 110 is exposed through the first region of the housing, and at least part of the input/output interface 120 may be exposed through the second region different from the first region.

The display 110 may output various contents (e.g., an image (a still image or a video), a text, an icon or a symbol). The display 110 may include a display driver integrated circuit (DDI). In an embodiment, the DDI may be electrically connected to the display 110, and may supply, to the display 110, an image signal according to image data received from the processor 150.

In an embodiment, the display 110 may be implemented with a touchscreen display including a display panel, a cover glass, and a touch panel (a touch sensor). The display panel may output the related content based on the image signal received from the DDI. The cover glass may be disposed on top surface of the display panel for passing through light according to the driving of the display panel. Moreover, a user input (e.g., touch, drag, proximity, hovering, or press) using at least part of a user's body (e.g., finger) or the stylus pen mounted in the electronic device 100 may be applied to the at least one region of the cover glass. The touch panel may detect a user input applied to the cover glass. The touch panel may include a touch controller. The touch controller is electrically connected to the touch panel and may detect the change in the physical quantity (e.g., voltage, light quantity, resistance, charge quantity, or capacitance) on the touch panel according to the user input. The touch controller may calculate data (e.g., coordinate (X, Y) data of the user input) of the user input based on the detected change in the physical quantity and may provide the calculated information to the processor 150. In various embodiments, the touch controller may include at least one of a driver circuit, a sensor circuit, control logic, an oscillator, a delay table, an analog-digital converter, or an MCU.

In an embodiment, when the display 110 is implemented with the touchscreen display, at least part of the display 110 may be used as a touch pad based on a specified condition. For example, when the electronic device 100 is connected to the external display device 200, the display 110 may function as a touch pad. In an operation in which at least part of the display 110 functions as a touch pad, when a specified user input mode (e.g., a second input mode, an absolute mode, or a stylus pen mode to be described later) is set on the electronic device 100, the display 110 may output a graphical user interface of a shape that is at least partly mapped (or corresponding) to the region of the display of the external display device 200.

The input/output interface 120 may support the transmission or reception of the data or signal between the electronic device 100 and the external display device 200. For example, the input/output interface 120 may transmit the data or signal input from the external display device 200, to the at least part of components of the electronic device 100, or may output the data or signal provided from the at least part of components of the electronic device 100 to the external display device 200. In an embodiment, the input/output interface 120 may include an electrical connector (e.g., USB cable or HDMI cable), a port, or a terminal that supports a wired connection to the external display device 200 (or the mediation device 300).

The communication circuit 130 may support communication between the electronic device 100 and at least one external device (e.g., the external display device 200, the mediation device 300, an external pointing device or an external keyboard device). The communication circuit 130 may establish wired communication or wireless communication to the at least one external device based on the defined protocol. The communication circuit 130 may transmit and receive various types of signals or various types of data to and from at least one external device, based on the wired communication or wireless communication.

The memory 140 may store at least a piece of data associated with the operation of the electronic device 100 or may store at least one instruction associated with the functional operations of components of the electronic device 100. In addition, the memory 140 may store at least one application preloaded at the manufacture of the electronic device 100 or installed in a third party form from an online market. Alternatively, the memory 140 may include at least one program for operating the display 110 of the electronic device 100 or for operating the display 210 of the external display device 200.

In an embodiment, under the control of the processor 150, when the electronic device 100 is connected to the external display device 200 via the mediation device 300 so as to operate in a specific mode (e.g., desktop mode described below) or when the electronic device 100 performs an operation of connecting to the external display device 200 via the mediation device 300, the memory 140 may store at least one application (e.g., a first application), which can be stably compatible with the specific mode (or can be operated stably in the operation), in a database. For example, the stable compatibility means that the resizing of the execution screen of the first application (or the window including the execution screen) is supported, when the execution screen of the first application is output via the display 210 of the external display device 200 when the electronic device 100 operates in the specific mode. For example, at least one tap button that supports the resizing (e.g., back, minimize, maximize, or close) may be provided in the region of the execution screen (or the window including the execution screen) of the compatible first application displayed on the display 210 of the external display device 200. Alternatively, a scroll bar supporting the movement of the range of execution screens based on the resizing by user control may be provided to one region of the execution screen of the first application. The database may store at least one information (e.g., application identifier, application package information, application version information, execution screen format information, or content information included in the execution screen) associated with the first application. Alternatively, the database may further store information about at least one application displayed (or the resizing is not supported) on the execution screen of a standardized size via the display 210 of the external display device 200.

The processor 150 may be electrically or operatively connected to the components of the electronic device 100 described above so as to perform control, communication operation, or data processing on the components. In an embodiment, the processor 150 may execute a specified launcher based on connection information between the electronic device 100 and the external display device 200 provided from a specific program in the framework (e.g., a desktop mode service described below). For example, while the electronic device 100 is disconnected to the external display device 200, the processor 150 may execute a first mode launcher (e.g., a normal mode launcher) for operating the display 110 of the electronic device 100. For example, the first mode launcher may set and manage a graphic format of a screen capable of being output to the display 110 of the electronic device 100. Alternatively, when the electronic device 100 is connected to the external display device 200, the processor 150 may execute a second mode launcher (e.g., desktop mode launcher). For example, for the purpose of providing the user of the electronic device 100 with a mobile desktop environment via the external display device 200, the second mode launcher may manage the related option information or graphic format.

According to an embodiment, with regard to the execution screen output of the specific application via the display 210 of the external display device 200, the processor 150 may determine whether the specific application supports the resizing of an execution screen (or a window including an execution screen) with reference to the database established in the memory 140. When the specific application supports the resizing of an execution screen, the processor 150 may generate the first type of window, which is resizable and which includes the execution screen of the specific application. In this operation, the processor 150 may reconfigure the at least part of the execution screen of the specific application included in the first type of window. For example, the processor 150 may reconfigure the size, resolution, or location of the text, image, UI, or UX included in the execution screen of the specific application so as to correspond to the format of the display 210 of the external display device 200. The processor 150 may provide the first type of window generated to include the execution screen of the specific application, to the external display device 200 and then may output the first type of window, via the display 210 of the external display device 200. When it is determined that the specific application does not support the resizing of an execution screen, the processor 150 may generate the second type of window, which includes the execution screen of the specific application and which has the fixed size. In this operation, for example, the processor 150 may configure the execution screen of the specific application included in the second type of window so as to be the same or similar to the format of the display 110 of the electronic device 100. The processor 150 may provide the second type of window generated to include the execution screen of the specific application, to the external display device 200 and then may output the second type of window, on the display 210 of the external display device 200.

In an embodiment, when the electronic device 100 is connected to the external display device 200, the processor 150 may identify a user input mode set from the user of the electronic device 100. For example, the user input mode may be associated with the method in which the user input applied to the display 110 of the electronic device 100 is specified on the display 210 of the external display device 200.

In an embodiment, when it is determined that the user input mode is in a specified second input mode (e.g., an absolute mode or a stylus pen mode, as described below) on the electronic device 100, the processor 150 may output a graphical user interface to the display 110. For example, the processor 150 may output a graphical user interface of a shape that is at least partly mapped (or corresponding) to the region (or the window output to the display 210) of the display 210 of the external display device 200. The graphical user interface output to the display 110 of the electronic device 100 supports the convenience of a user who applies a user input while watching the display 110. According to an embodiment, while outputting the graphical user interface, the processor 150 may support the low power operation of the electronic device 100 by controlling the image data being transmitted to the at least part of the pixels of the display 110 of the electronic device 100. For example, the processor 150 may control the image data (e.g., an alpha (a) value or an RGB gradation value) associated with at least one of the brightness or gradation of an image to transmit the image data to at least part of pixels of the display 110 (e.g., a pixel independent of the output of the graphical user interface), and thus, the processor 150 may allow the screen region corresponding to the at least part of pixels to be displayed at low luminance or low gradation.

In an embodiment, the processor 150 may output the graphical user interface to the display 110 of the electronic device 100 and then may determine whether there is a user input on the display 110 during a specified time period. When receiving a user input on the electronic device 100 within the specified time period, the processor 150 may control the display 110 to interrupt the output of the graphical user interface. Alternatively, after a specified time elapses from the receipt of a user input within the specified time period, the processor 150 may control the display 110 to interrupt the output of the graphical user interface. In various embodiments, when the user input is not received during a specified time from the output interruption of the graphical user interface, the processor 150 may again output the graphical user interface, the output of which has been stopped.

In an embodiment, when the electronic device 100 is connected to the external display device 200, the processor 150 may determine whether the electronic device 100 is connected to an external input device (e.g., pointing device). When it is determined that the electronic device 100 is connected to the external input device and the user input via the external input device occurs on the display 110 of the electronic device 100 before outputting the graphical user interface, the processor 150 may exclude the output of the graphical user interface. Alternatively, when the user input via the external input device occurs at the time after the graphical user interface is output to the display 110 of the electronic device 100, the processor 150 may temporarily interrupt the output of the graphical user interface. In various embodiments, the processor 150 may resume the output of the graphical user interface within a specified time from a point in time when the user input via the external input device is completed.

In another embodiment, when the electronic device 100 is connected to the external display device 200 and the user input mode is set to the specified second input mode, the processor 150 may determine the approach or proximity of the stylus pen to the electronic device 100. For example, the processor 150 may determine the approach or proximity of the stylus pen to the electronic device 100, based on the signal detection of the specific frequency band transmitted by the stylus pen. When the approach or the adjacent distance of the stylus pen is within the specified distance range, the processor 150 may output the graphical user interface to the display 110 of the electronic device 100. Alternatively, when the separation of the stylus pen from the recess region in which the stylus pen is mounted, is detected on the electronic device 100, the processor 150 may output the graphical user interface. In other words, the processor 150 may output a graphical user interface that functions as a region guide for the user input at a point in time when the user input using the stylus pen is expected.

In an embodiment, the electronic device 100 may receive the update of the functionality, version, or service of the mounted or installed application from the provider (e.g., the manufacturer of the electronic device 100, the manufacturer of operating system, a mobile network operator, or a third party developer) of the mounted or installed application. The processor 150 may update the database established in the memory 140 based on the update information of the application, or may update information (e.g., application identifier, application package information, application version information, format information of execution screen, or content information included in the execution screen) associated with at least one application included in the database.

Referring to FIG. 4, the electronic device 100 may include at least one program stored in the memory 140. For example, the electronic device 100 includes at least one application 410, 420, and/or 430, a normal mode launcher 440, a desktop mode launcher 450, a framework 460, a resource 470, a configuration 480, and a display info 490. According to an embodiment, the at least one program described above may be executed or controlled by the processor 150 of the electronic device 100.

Each of the at least one application 410, 420, and/or 430 may include a plurality of activities. For example, the first application 410 includes a first activity 411, a second activity 412, and a third activity 413. Although FIG. 4 shows an example of the first application 410 that includes the three activities 411, 412, and 413, each of the at least one application 410, 420, and/or 430 may include any number of activities. In an embodiment, the activity may require an execution screen in the portrait or portrait direction, or may require an execution screen in the portrait and portrait directions.

The normal mode launcher 440 may be executed when the electronic device 100 is disconnected to the external display device 200. In an embodiment, the normal mode launcher 440 may manage and provide a home screen or a variety of UI or UX of the electronic device 100 output via the display 110 of the electronic device 100.

The desktop mode launcher 450 may be executed when the electronic device 100 is connected to the external display device 200. According to an embodiment, upon connection between the electronic device 100 and the external display device 200, the desktop mode launcher 450 may provide an introduction including information about the desktop mode, and may also provide an option of the execution of the desktop mode or a mirroring connection option. Furthermore, for the purpose of providing the mobile desktop environment to the user of the electronic device 100, the desktop mode launcher 450 may provide a window (e.g., a window including an execution screen of an application), UI, or UX, which is similar to the screen displayed on the display 210 of the external display device 200. The desktop mode launcher 450 may support the resizing of a resizable window.

In an embodiment, the desktop mode launcher 450 may include a white list update service 451 and a white list database 452 (e.g., a database established in the memory 140 described above). The white list update service 451 may obtain a white list, which is a list of resizable applications, from an external server that supports the download of the at least one application 410, 420, and/or 430. The white list update service 451 may periodically determine whether the external list of the external server is updated, using the alarm service after the desktop mode launcher 450 is executed. The white list update service 451 may obtain the URI of the white list file, using the API provided by the content cloud server and may download the white list file. For another example, when the white list is updated, the external server may transmit a white list to a policy manager 463 included in the framework 460 of the electronic device 100. The policy manager 463 may store a white list in a policy database. In an embodiment, the white list update service 451 may receive a white list from the policy manager 463 and may store the white list in the white list database 452. The white list database 452 may store information (e.g., application identifier, application package information, application version information, execution screen format information, or content information included in the execution screen) of an application supporting the resizing. The white list stored in the white list database 452 may include at least one application mounted or installed in the electronic device 100.

In an embodiment, the framework 460 may include at least one of a desktop mode service 461, a desktop mode policy manager 462, the policy manager 463, a window manager 465, an activity manager 466, or a multi window manager 467.

When the application is executed, the desktop mode service 461 may collect at least a pieces of information associated with the resizing of the executed application. For example, the desktop mode service 461 may collect declaration information about whether to support the resizing included in the manifest of the application, information about whether the application corresponds to the preload application, or information about whether the application is included in the white list.

The desktop mode policy manager 462 may receive at least a piece of information collected by the desktop mode service 461. The desktop mode policy manager 462 may determine whether to generate a window of the first type or window of the second type for outputting the execution screen of the application, based on the received at least one information. The desktop mode policy manager 462 may transmit the determination result to the desktop mode service 461 and the desktop mode service 461 may provide the service based on the transmitted determination result.

The window manager 465 may change the configuration 480. The window manager 465 may generate a window based on the changed configuration 480. For example, when the configuration 480 is changed, the window manager 465 may generate an event to change the configuration 480 and may generate a window based on the changed configuration 480. The window manager 465 may display the at least one tab button (or icon) for providing a function associated with at least one of back, minimize, maximize, or close to the top header of the window. For example, when generating a resizable window (e.g., window including the execution screen of an application) that occupies the partial region of the display 210 of the external display device 200, the window manager 465 may display at least one tab button for providing a back, minimize, maximize, or close function in the top header of the generated window. For another example when generating the resizable window occupying all area of the display 210 of the external display device 200, the window manager 465 may display at least one tab button for providing a back, minimize, switch to a pop-up window, or close function in the top header of the generated window. For another example, when generating a non-rotatable window having the fixed size, the window manager 465 may display at least one tab button for providing a back, minimize, or close function in the top header of the generated window. For another example, when generating a rotatable window having the fixed size, the window manager 465 may display at least one tab button for providing a back, rotation, minimize, or close function in the top header of the generated window.

When the configuration 480 is changed, the activity manager 466 may obtain the changed configuration 480 from the window manager 465. The activity manager 466 may allow the manager of the resource 470 to update the resource 470 based on the changed configuration 480. The activity manager 466 may allow a screen to be formed based on the configuration 480 in which at least one application 410, 420, and/or 430 or the activity included in the application is changed.

For example, the multi window manager 467 may provide a function associated with a window that is not supported by the window manager 465. For example, the multi window manager 467 may generate the second type of window described above. For another example, the multi window manager 467 may provide a function to minimize the window. For another example, the multi window manager 467 may generate an additional window including a tap button (or icon) for providing a function associated with at least one of back, minimize, maximize, or close. The multi window manager 467 may arrange the additional window on the display 210 of the external display device 200 so as to be adjacent to a window including the execution screen of an application.

The resource 470 may include the resource 470 of the activity included in the application. For example, an activity resource 471 may include information about the image and layout included in the execution screen of the activity being changed, based on the configuration 480.

The configuration 480 may include information about at least one of the density (dpi) of the screen generated by the electronic device 100, direction (e.g., portrait or landscape direction), the total size of the screen, or the execution screen size of the application. The configuration 480 may correspond to each activity included in the application.

The display info 490 may include information about the physical size (e.g., width or height) of the display.

FIGS. 5, 6, 7, and 8 are diagrams of various shapes of graphical user interfaces output by an electronic device, according to an embodiment. In FIG. 5, 6, 7, or 8, the same reference numerals may be assigned to components corresponding to the above-described components, and redundant descriptions may be omitted. In addition, the characteristics of the graphical user interface described with reference to one of the drawings may be similarly applied to the graphical user interface described with reference to other drawings, unless a specific limitation is described.

Figure 5:
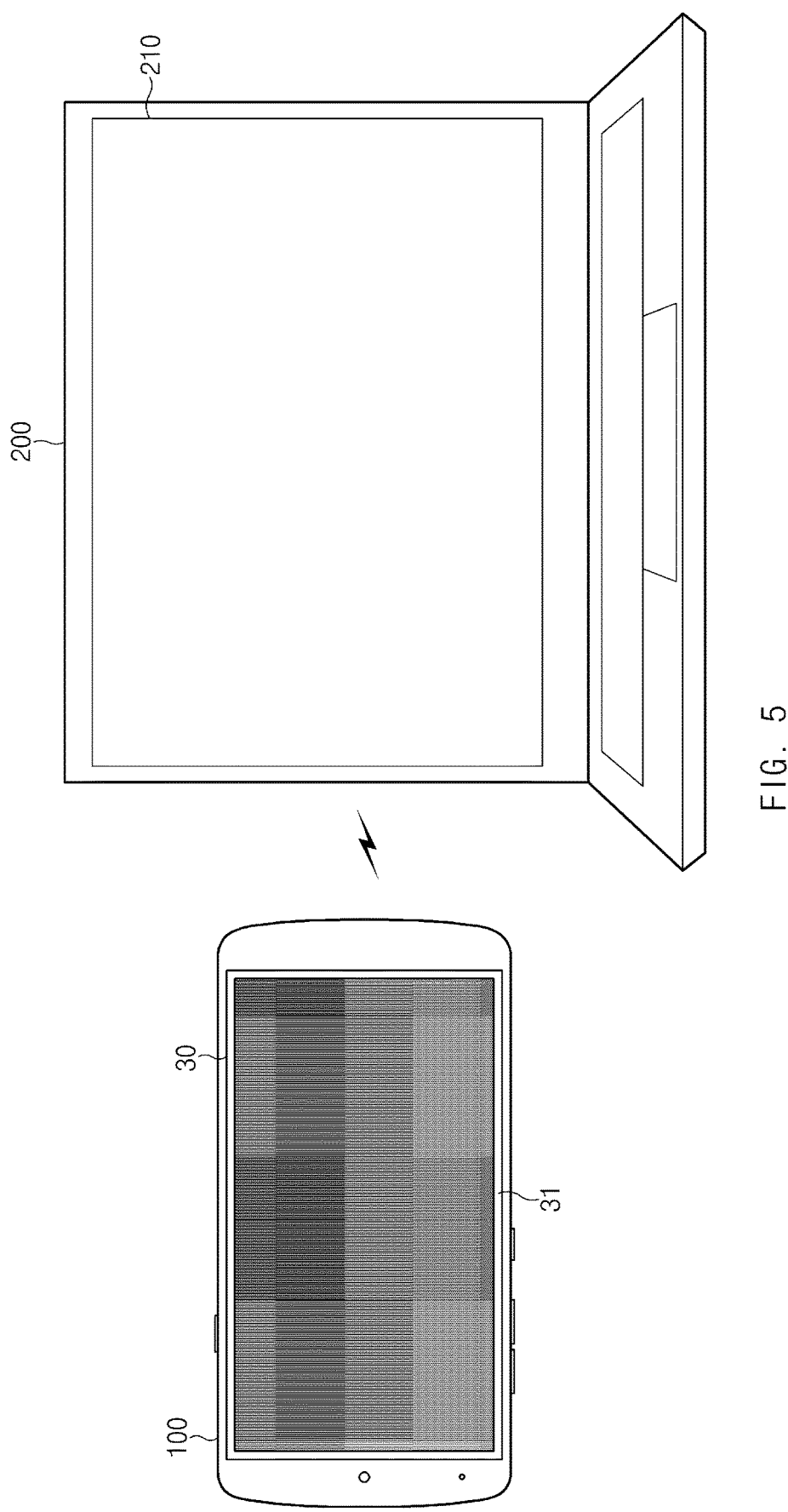
FIG. 5 is a diagram of a shape of graphical user interface output by an electronic device, according to an embodiment.

Referring to FIG. 5, when the electronic device 100 is connected to the external display device 200 and it is determined that the user input mode set from the user of the electronic device 100 is a specified second input mode (e.g., an absolute mode or a stylus pen mode, described below), a processor of the electronic device 100 may output a graphical user interface 30 to at least one region of the display. In an embodiment, the graphical user interface 30 may include a guide line 31 corresponding to an edge region of the graphical user interface 30. When controlling the output of graphical user interface 30, the processor 150 may determine the size or area of the graphical user interface 30 such that the guide line 31 corresponds to (or coincides with) the edge of the active region in the region of the display 110 of the electronic device 100. For example, the inner region of the guide line 31 may indicate the range of the application region of the user input applied to the electronic device 100 to control the screen output to the display 210 of the external display device 200

In an embodiment, the processor 150 may control graphic elements for the at least one region of the graphical user interface 30. For example, for the purpose of supporting the low power operation of the electronic device 100 in the operation of outputting the graphical user interface 30, the processor 150 may control the graphic elements of some regions (e.g., the inner region of the guide line 31, hereinafter referred to as the first region) other than the guide line 31 in the graphical user interface 30. The processor 150 may control the pixels of the display 110 corresponding to the first region to emit light at a low resolution or a low framerate. Alternatively, the processor 150 may control the image data to be transmitted to the pixels of the display 110 corresponding to the first region. In various embodiments, the processor 150 may control the alpha (α) value associated with the brightness to be set to a value of '0' based on '0' to '100', as part of the image data control. Alternatively, the processor 150 may control the RGB gradation value associated with the concentration to a value of '255' based on '0' to '255'.

Figure 6:
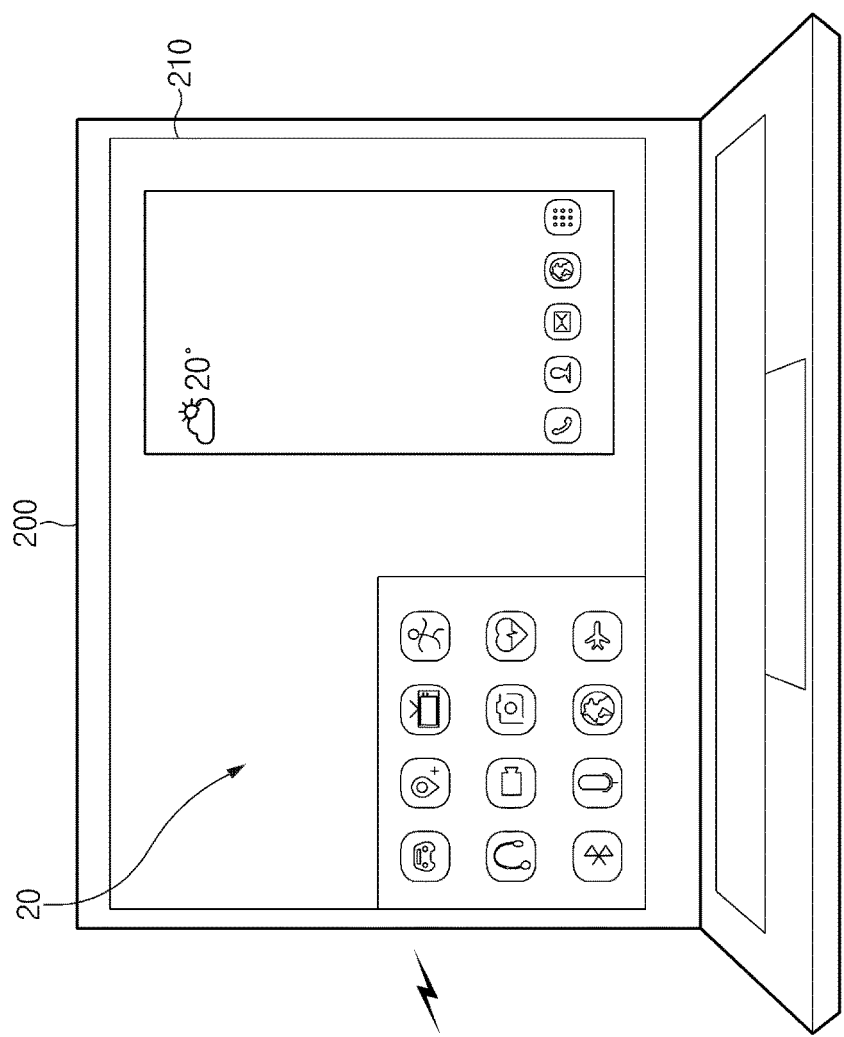
FIG. 6 is a diagram of a shape of graphical user interface output by an electronic device, according to an embodiment.
Figure 6:
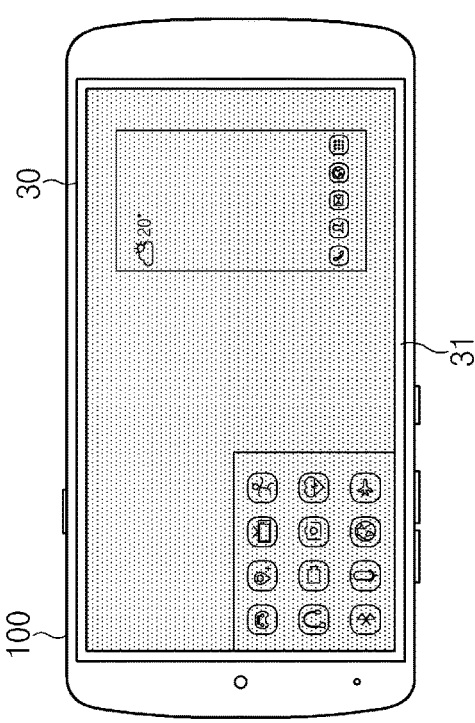

Referring to FIG. 6, the electronic device 100 may include a screen corresponding to a screen 20 of the display 210 of the external display device 200, in the first region included in the graphical user interface 30. In this regard, the processor 150 may collect at least one window, UI, or UX information (e.g., coordinate information, size information, or content information) displayed on the screen 20 of the display 210 of the external display device 200. For example, the processor 150 may collect information from a window manager (465 in FIG. 4) generating the window or a desktop mode launcher (450 in FIG. 4) providing the window, UX or UI. Alternatively, the processor 150 may obtain information about the window or UI, which the external display device 200 separately outputs, from the external display device 200.

In an embodiment, the processor 150 may control the image data to be transmitted to the pixels of the display 110 corresponding to the first region such that the first region other than the guide line 31 in the graphical user interface 30 is displayed translucently. For example, the processor 150 may control the alpha (a) value associated with the brightness to be set to a value of about '20' to '30' based on '0' to '100' and may transmit the control value to the pixels of the display 110 corresponding to the first region.

Figure 7:
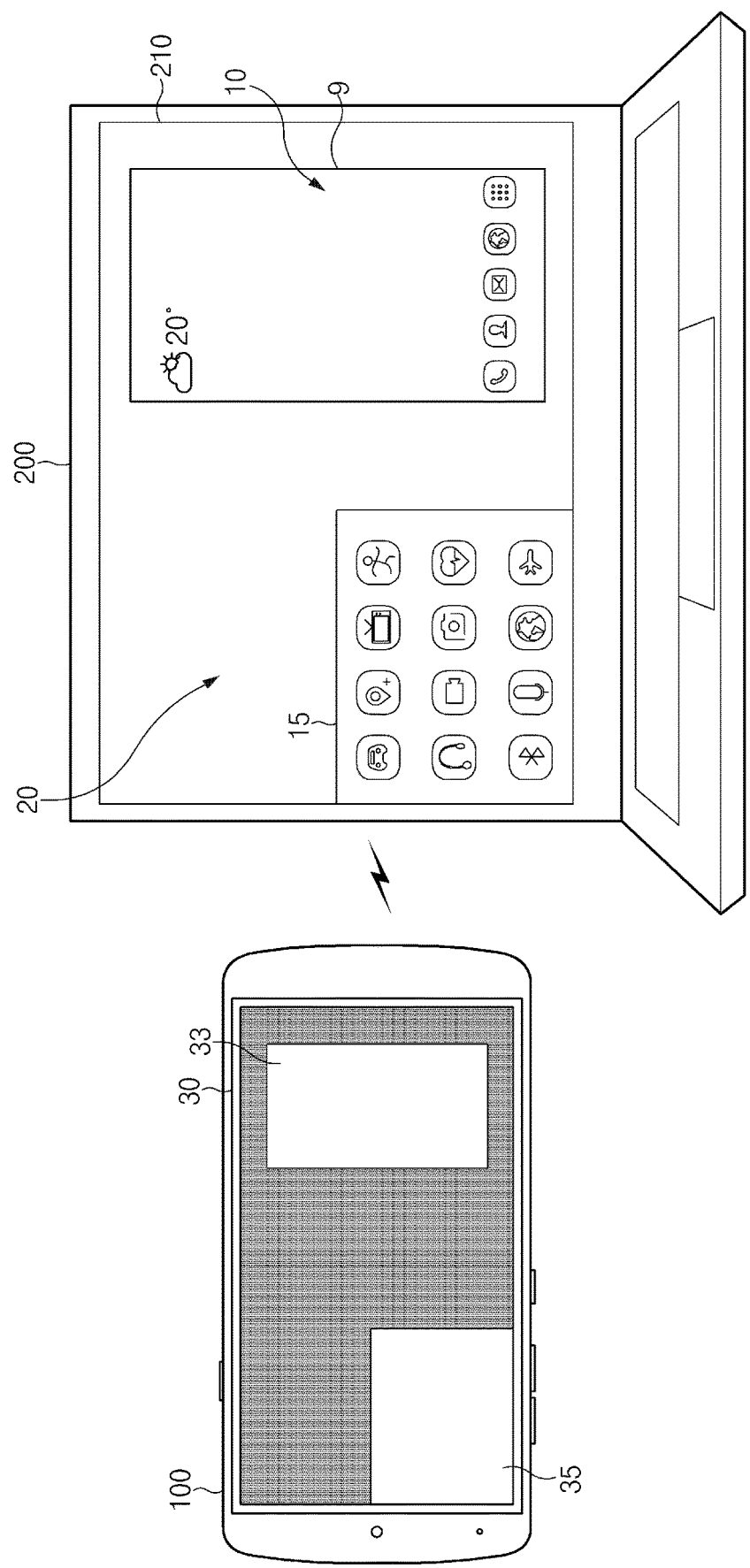
FIG. 7 is a diagram of a shape of graphical user interface output by an electronic device, according to an embodiment.

Referring to FIG. 7, the electronic device 100 may include at least one guide region (33 and/or 35) corresponding to the screen 20 of the display 210 of the external display device 200, in the first region included in the graphical user interface 30. In an embodiment, the at least one guide region 33 and/or 35 may be associated with window 9 and/or UI 15 displayed on the screen 20 of the display 210 of the external display device 200. For example, the at least one guide region 33 and/or 35 may be mapped to the window 9 displayed on the screen 20 of the display 210 of the external display device 200, at the specified ratio. Alternatively, the at least one guide region 33 and/or 35 may be a region mapped to the UI 15 (e.g., a UI including at least one object (icon) associated with the execution of an application that the electronic device 100 includes) output separately from the external display device 200, at a specified ratio. In various embodiments, the mark of at least one content (or screen or icon) that the corresponding window 9 or UI 15 includes may be excluded in the at least one guide region 33 and/or 35.

In an embodiment, the processor 150 may control the pixel of the display 110 corresponding to the second region such that the second region other than the at least one guide region 33 and/or 35 in the first region, which the graphical user interface 30 includes, emits light at a low resolution, a low framerate, a low brightness, or a low concentration similar to those described above.

Figure 8:
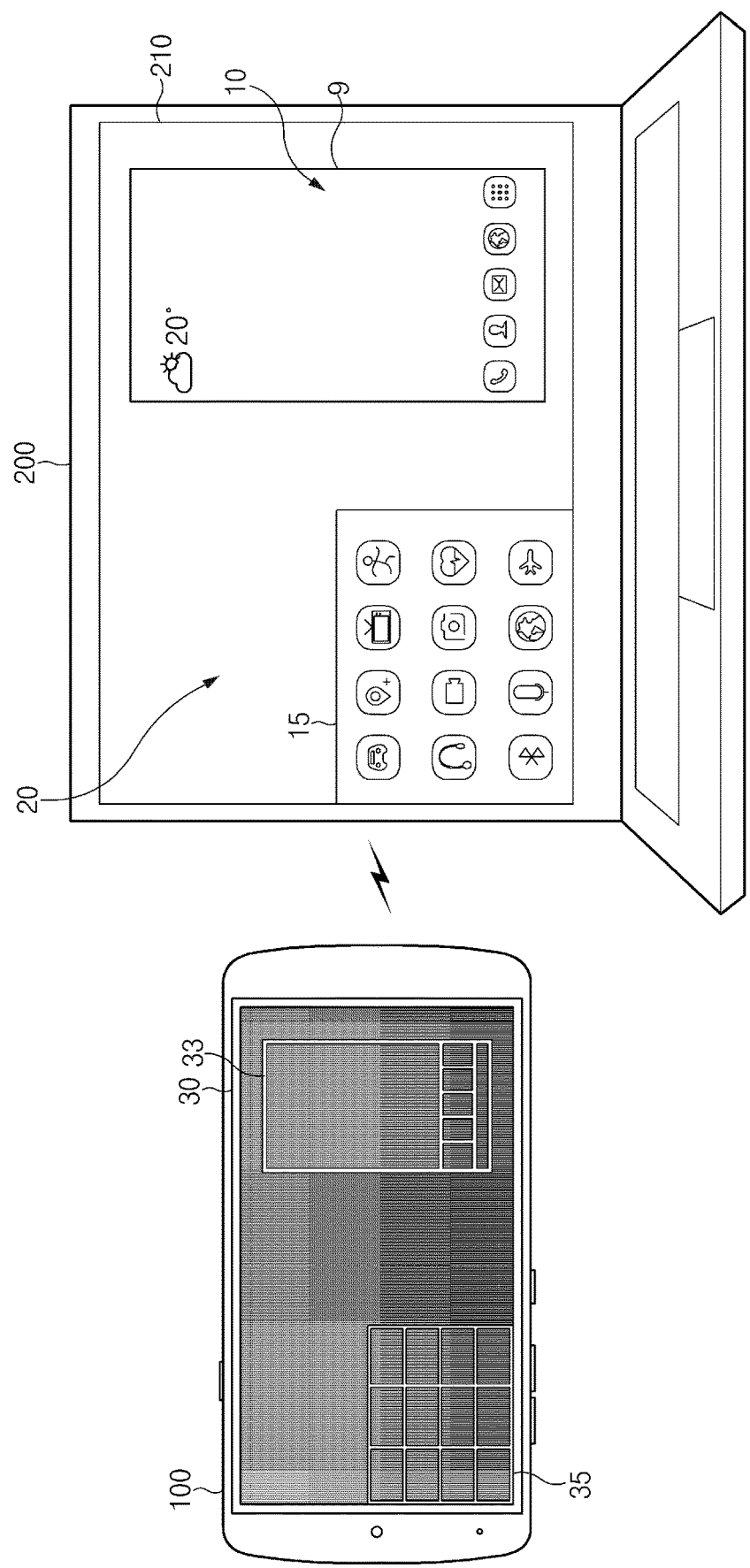
FIG. 8 is a diagram of a shape of graphical user interface output by an electronic device, according to an embodiment.

Referring to FIG. 8, the processor 150 may display the layout of at least one content, which the window 9 (or a screen 10 in the window 9) or UI 15 corresponding to the guide region 33 and/or 35 includes, in the at least one guide region 33 and/or 35 included in the graphical user interface 30. For example, the processor 150 may display the layout of all pieces of content included in the window 9 or UI 15. Alternatively, the processor 150 may display only the layout of content (e.g., first content) including a link function among at least a piece of content included in the window 9 or the UI 15. In an embodiment, the first content including the link function may indicate that a screen (or a window including the screen associated with the first content) associated with the first content or UI is displayed on the screen 20 of the display 210 of the external display device 200, when the first content in the window 9 or UI 15 is selected by a user input on the display (110 of FIG. 2) of the electronic device 100. The processor 150 may refer to the activity resource (470 in FIG. 4) included in the application. Alternatively, the processor 150 may obtain content information (e.g., the content information including the link function or location information of the content including the link function) in the UI 15 separately output by the external display device 200, from the external display device 200. The processor 150 may determine the location of the layout displayed within the at least one guide region 33 and/or 35 based on the referred or obtained information.

In various embodiments, a specified display effect (e.g., flashing display or color display) according to the state of window 9 or UI 15 corresponding to at least one guide region 33 and/or 35 may be assigned to one of at least one guide region 33 and/or 35 described with reference to FIG. 7 or 8. For example, the processor 150 may control the display 110 of the electronic device 100 such that the specific guide region corresponding to the window 9 or UI 15, which is in a focusing state on the screen 20 of the display 210 of the external display device 200, is displayed in the specified color. The focusing state refers to a state in which the window 9 or UI 15 being output is selected on the screen 20 of the display 210 of the external display device 200 by the user input via the external input device (e.g., a pointing device (400 in FIG. 2) or a keyboard device (500 in FIG. 2)) connected to the electronic device 100 or the electronic device 100.

In an embodiment, when a user input using a user's body or a stylus pen is applied to at least part of the first region included in the graphical user interface 30 described above with reference to FIGS. 5, 6, 7, and 8, the processor 150 may convert the first coordinate value according to the user input into the second coordinate value corresponding to the size or area of the display 210 of the external display device 200 to provide the second coordinate value to the external display device 200. As such, the external display device 200 may apply the user input applied to the electronic device 100, to the screen 20 being output by that the display 210 by receiving and processing the second coordinate value.

In various embodiments, with regard to the low-power operation of the electronic device 100, the graphic element control (e.g., resolution, framerate, brightness, or concentration control) for the at least one region of the graphical user interface 30 performed by the processor 150 may be performed based on the amount of available power of the electronic device 100. For example, when the power supply device (e.g., battery) of the electronic device 100 is charged with a power greater than a specified threshold, the processor 150 may exclude the graphic element control for the at least one region of the graphical user interface 30.

Figure 9A:
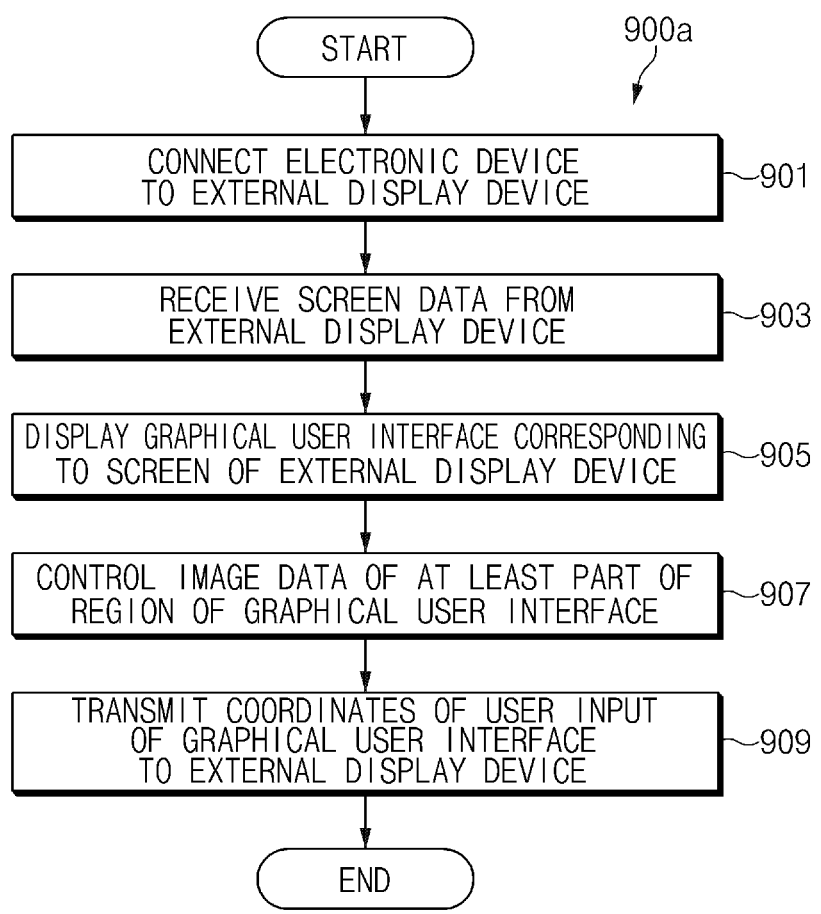
FIG. 9A is a flowchart of a user input supporting method of an electronic device, according to an embodiment.

FIG. 9A is a flowchart of a user input supporting method 900a of an electronic device, according to an embodiment.

Referring to FIG. 9A, in operation 901, an electronic device (e.g., 1001 in FIG. 1 or 100 in FIG. 2, hereinafter collectively referred to as the reference numeral of 100) is connected to an external display device (e.g., 200 in FIG. 2). For example, the electronic device 100 may be connected to the external display device 200 via the mediation device 300 of FIG. 2. Alternatively, the electronic device 100 may be connected to the external display device 200 via a wired connector (e.g., USB cable or HDMI cable), a port, or a terminal included in the input/output interface (120 in FIG. 3).

In operation 903, the processor (150 in FIG. 3) of the electronic device 100 determines the output condition of the graphical user interface (e.g., 30 of FIG. 5, 6, 7, or 8) to be output to the display (110 in FIG. 2). For example, the processor 150 may identify a user input mode set from the user of the electronic device 100. Alternatively, after identifying the user input mode, the processor 150 may further determine the approach or proximity of the stylus pen to the electronic device 100.

When it is determined that the identified user input mode is the specified second input mode (when the approach or proximity of the stylus pen is detected after the processor 150 identifies the second input mode), in operation 905, the processor 150 outputs the graphical user interface 30 to the display 110 of the electronic device 100.

According to an embodiment, the graphical user interface 30 may function as a region guide for a user input on the display 110 of the electronic device 100 to control the screen of the display 210 of the external display device 200. The graphical user interface 30 may include a guide line (e.g., 31 in FIG. 5) corresponding to the edge region of the graphical user interface 30. For example, the guide line 31 may indicate an applied region range for a user input applied to the electronic device 100 to control the screen of the display 210 of the external display device 200. The processor 150 may determine the size or area of the graphical user interface 30 such that the guide line 31 corresponds to (or coincides with) the edge of the active region in the region of the display 110 of the electronic device 100.

In an embodiment, the graphical user interface (e.g., 30 of FIG. 6) may include a screen that corresponds to the screen of the display 210 of the external display device 200, in an internal region (e.g., an inner region of the guide line 31). With reference to the function operation of at least one program (e.g., the window manager 465 of FIG. 4 or the desktop mode launcher 450 of FIG. 4) included in the memory 140 in FIG. 2, the processor 150 may configure a screen corresponding to the screen output by the display 210 of the external display device 200, in the graphical user interface 30. Alternatively, the processor 150 may receive information about the window or UI that the external display device 200 separately outputs, from the external display device 200. With reference to the received information, the processor 150 may configure a screen corresponding to the screen of the display 210 of the external display device 200 in the graphical user interface 30.

In an embodiment, the graphical user interface (e.g., 30 of FIG. 7 or 8) may include at least one guide region (e.g., 33 and/or 35 of FIG. 7 or 8) mapped to the window or UI displayed on the screen of the display 210 of the external display device 200 at a specified rate, in an internal region (e.g., the inner one region of the guide line 31). In various embodiments, the mark of at least one content (or screen or icon) that the corresponding window or UI includes may be excluded in the at least one guide region 33 and/or 35. The at least one guide region 33 and/or 35 may include the layout of at least one content that the corresponding window or UI includes. For example, the at least one guide region 33 and/or 35 may display the layout of all pieces of content that the window or UI includes, or may display only the layout of content including the link function among at least a piece of content.

In operation 907, the processor 150 of the electronic device 100 controls a graphic element of at least part of the region of the graphical user interface 30, with regard to the low-power operation of the electronic device 100. For example, the processor 150 may allow the pixel of the display 110 corresponding to a region other than the guide line 31 in the graphical user interface 30 to emit light at a low resolution or a low framerate. Alternatively, the processor 150 may control image data to be transmitted to the pixel of the display 110 such that the pixel of the display 110 corresponding to the region other than the guide line 31 in the graphical user interface 30 emits at a low brightness or a low concentration.

In operation 909, the processor 150 receives a user input applied to at least one region of the graphical user interface 30. According to an embodiment, the user input is user manipulation for controlling (e.g., executing the application of the electronic device 100 according to the selection of an object (icon) included in the screen) the screen of the display 210 of the external display device 200 via the electronic device 100. The processor 150 may detect the coordinates for the user input and may convert the detected coordinate value into a coordinate value corresponding to the size or area of the display 210 of the external display device 200 to transmit the converted coordinate value to the external display device 200. As such, the external display device 200 may apply the user input, which is to be applied to the graphical user interface 30, to the screen of the display 210 by processing the coordinate information received from the electronic device 100. In an embodiment, the applying of the user input is an operation of selecting an object (icon) corresponding to the converted coordinates, an operation of executing the application associated with the selected object, or an operation of outputting the execution screen of the executed application.

Figure 9B:
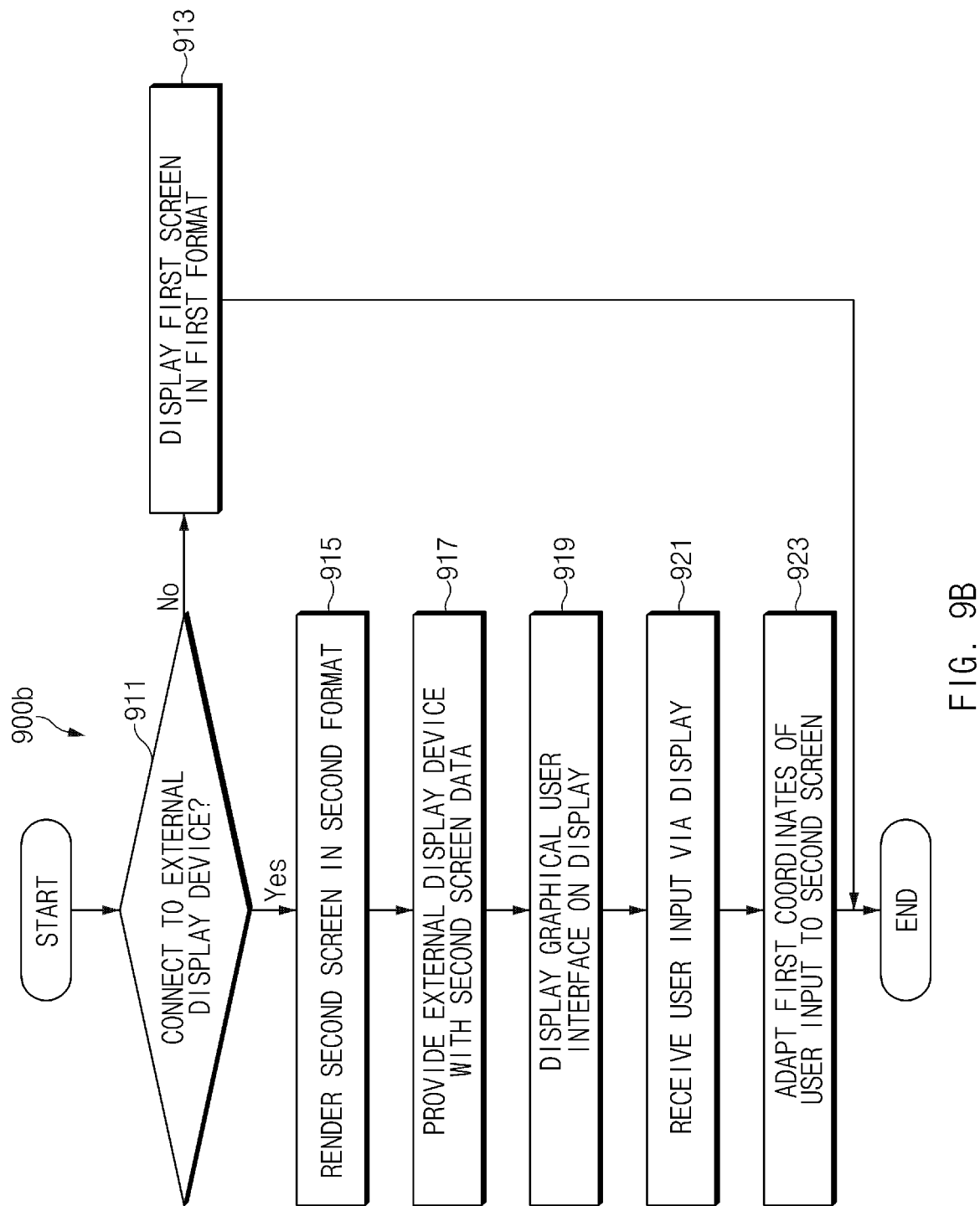
FIG. 9B is a flowchart of an operation process for supporting a user input of an electronic device, according to an embodiment.

FIG. 9B is a flowchart of an operation process 900b for supporting a user input of an electronic device, according to an embodiment.

Referring to FIG. 9B, in operation 911, the processor 150 of FIG. 3 of an electronic device (e.g., 1001 in FIG. 1 or 100 in FIG. 2, hereinafter collectively referred to as the reference numeral of 100) determines the connection between the electronic device 100 and the external display device (200 of FIG. 2). The processor 150 may determine the connection between the electronic device 100 and the specified mediation device 300 of FIG. 2. In an embodiment, the mediation device 300 may support the connection between the electronic device 100 and the external display device 200; when the connection to the mediation device 300 is detected based on the connection of an electrical connector (e.g., USB cable or HDMI cable), a port, or a terminal, the processor 150 may determine that the electronic device 100 and the external display device 200 are connected to each other. In an embodiment, the external display device 200 may include a display device (e.g., a monitor, a laptop, or TV) that receives data from the electronic device 100 connected via the mediation device 300 and outputs the related at least one content (or screen).

According to an embodiment, when it is determined that the electronic device 100 and the external display device 200 are not connected to each other, in operation 913, the processor 150 displays the first screen on the display 110 in FIG. 3 of the electronic device 100 in the specified first format. According to an embodiment, the first format may include the execution of the normal mode launcher 440 of FIG. 4 for operating the display 110 of the electronic device 100. The processor 150 may set or manage a graphic format for a screen capable of being output to the display 110 of the electronic device 100 in the first format according to the execution of the normal mode launcher 440. The processor 150 may operate in the first format to display a first screen (e.g., the home screen of the electronic device 100 or the user interface of the electronic device 100) (or the execution screen of the application) including icons associated with a plurality of applications mounted on the electronic device 100, on the display 110.

According to an embodiment, when it is determined that the electronic device 100 and the external display device 200 are connected to each other, in operation 915, the processor 150 operates in a specified second format to render a second screen to be output via the external display device 200. For example, the second format may include the execution of the desktop mode launcher 450 in FIG. 4 for providing a mobile desktop environment via the external display device 200. The processor 150 may operate in the second format according to the execution of the desktop mode launcher 450, and may perform rendering (e.g., the adjustment of the size, resolution, color, or location of a text, image, UI or UX, which is included in the second screen) for reconfiguring at least part of a second screen (e.g., the home screen of the electronic device 100 or the user interface of the electronic device 100) (or the execution screen of the application) including icons associated with the plurality of applications so as to correspond to the display format of the external display device 200.

In operation 917, the processor 150 provides the external display device 200 with the data of the rendered (or reconfigured) second screen. As such, the external display device 200 may provide the user of the electronic device 100 with an environment similar to an environment in which the user utilizes a desktop PC, by processing and displaying the data of the second screen provided from the electronic device 100.

In operation 919, the processor 150 displays the specified graphical user interface (30 of FIG. 5, 6, 7, or 8) via the display 110 of the electronic device 100. According to an embodiment, the graphical user interface 30 may indicate at least one object included in the second screen output via the external display device 200. For example, the graphical user interface 30 may be displayed in the shape at least partly mapped to an application-related icon, a user interface, or an object of the window, which is included in the second screen. As such, the graphical user interface 30 supports the convenience of a user who applies a user input while watching the display 110 of the electronic device 100.

In an embodiment, with regard to the display of the graphical user interface 30, when the connection between the electronic device 100 and the external display device 200 is determined, the processor 150 may identify the user input mode set in the electronic device 100. When the identified user input mode is an input mode (e.g., a second input mode, an absolute mode, or a stylus pen mode, described below) in which the user input applied to the electronic device 100 is mapped to a ratio according to the resolution of the external display device 200 on the external display device 200 and then is specified, the processor 150 may display the graphical user interface 30.

In operation 921, the processor 150 receives the user input applied to the display 110 of the electronic device 100. For example, the processor 150 may receive a user input using at least part of the user's body (e.g., finger) or a stylus pen mounted in the electronic device 100. For example, the user input is a user manipulation for controlling the second screen displayed on the external display device 200 via the electronic device 100.

In operation 923, the processor 150 adapts the first coordinates of the user input applied to the display 110 of the electronic device 100 to the second screen displayed on the external display device 200. The processor 150 may convert the first coordinates of the user input to provide the converted result to the external display device 200. For example, the processor 150 may convert the first coordinates into the second coordinates corresponding to the size, area, or resolution of the display of the external display device 200, and may provide the external display device 200 with data for the converted second coordinates. As such, the external display device 200 may adapt the user input, which is applied to the electronic device 100, to the second screen being displayed, by processing the provided data of the second coordinate.

Figure 10:
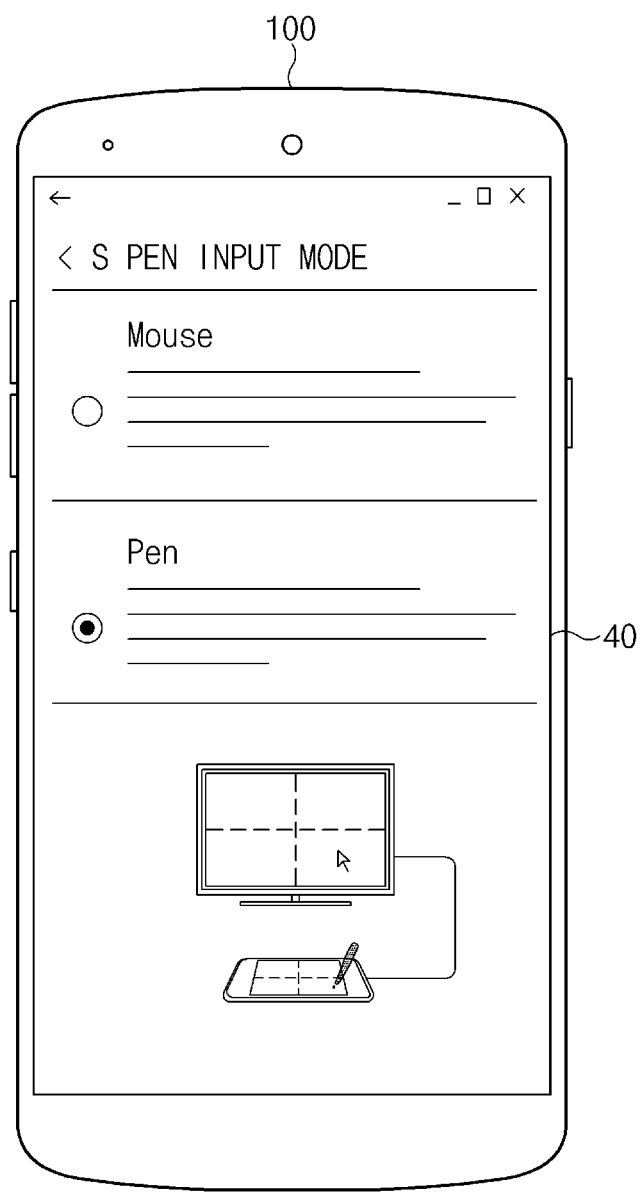
FIG. 10 is a diagram of an input mode setting screen of an electronic device, according to an embodiment.

FIG. 10 is a diagram of an input mode setting screen of an electronic device, according to an embodiment.

Referring to FIG. 10, the electronic device 100 (e.g., the electronic device 1001 of FIG. 1) may output the above-described graphical user interface (30 of FIG. 5, 6, 7, or 8) based on settings of the user input mode assigned by a user. The processor 150 of FIG. 3 of the electronic device 100 may obtain user input mode information selected from the user, on an input mode setting screen 40 of the electronic device 100. In an embodiment, the user input mode may be associated with the movement of an object (e.g., a pointer) supporting the display of a user input (e.g., a user input using a body or a stylus pen) applied to the electronic device 100 on a screen of the display 210 of FIG. 2 of the external display device 200 of FIG. 2. For example, the user input mode may include a first input mode (or a relative mode, or a mouse mode), in which the object moves equally to a user input on the electronic device 100. In the first input mode, the object may be displayed as a motion equal to the speed, direction, or movement distance of the user input applied to the electronic device 100, starting from the coordinates positioned on the screen of the display 210 of the external display device 200. When the first input mode is set, the speed, direction, or movement distance of the user input may be displayed as a movement similar to a user input via an external input device (e.g., pointing device 400 of FIG. 2) connected to the electronic device 100.

Alternatively, the user input mode may include a second input mode (or an absolute mode or a stylus pen mode) in which the object moves to coordinates mapped to coordinates of a user input applied to the electronic device 100 on the screen of the display 210 of the external display device 200, based on the resolution ratio of the display of the electronic device 100 to the display of the external display device 200. When the display resolution ratio between the electronic device 100 and the external display device 200 is 1:3, the object may be displayed as moving by 3 cm on the screen of the display 210 of the external display device 200, in response to the movement distance of 1 cm of the user input applied to the electronic device 100. As described above, because, in the first input mode (or a relative mode or a mouse mode), it is possible to intuitively recognize a user input through an object moving in proportion to the speed, direction or movement distance of a user input applied to the electronic device 100, the display of the graphical user interface functioning as a region guide for the user input may be excluded. The processor 150 of the electronic device 100 may output the above-described graphical user interface on the premise of the connection to the external display device 200 and setting of the second input mode (or an absolute mode or a stylus pen mode) by the user. However, the output of the graphical user interface assuming the second input mode is according to one embodiment. When the electronic device 100 and the external display device 200 are connected to each other, the processor 150 of the electronic device 100 may output a graphical user interface to the display 110 regardless of the user input mode.

Figure 11:
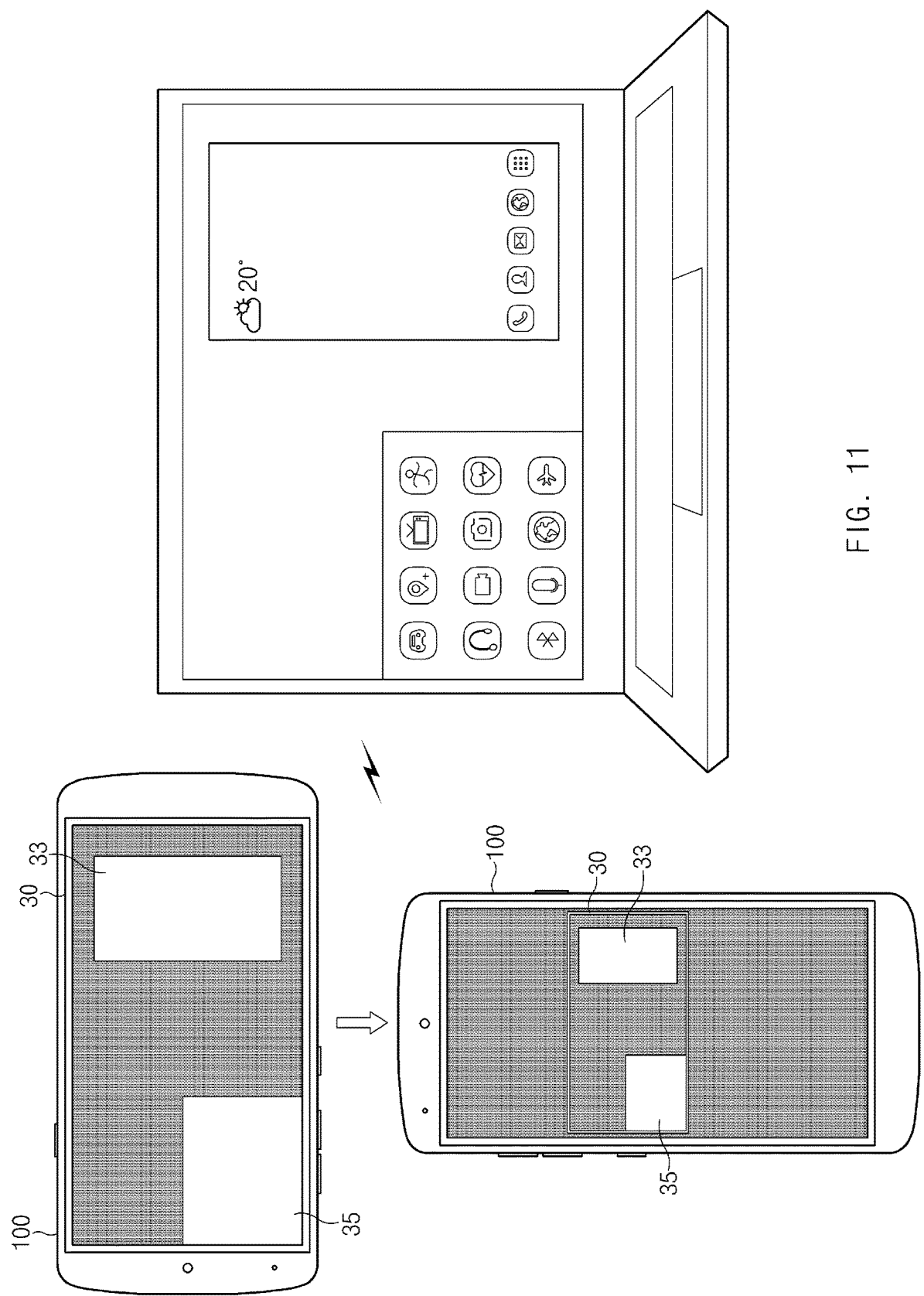
FIG. 11 is a diagram of an output shape of a graphical user interface for orientation of an electronic device, according to an embodiment.
Figure 12:
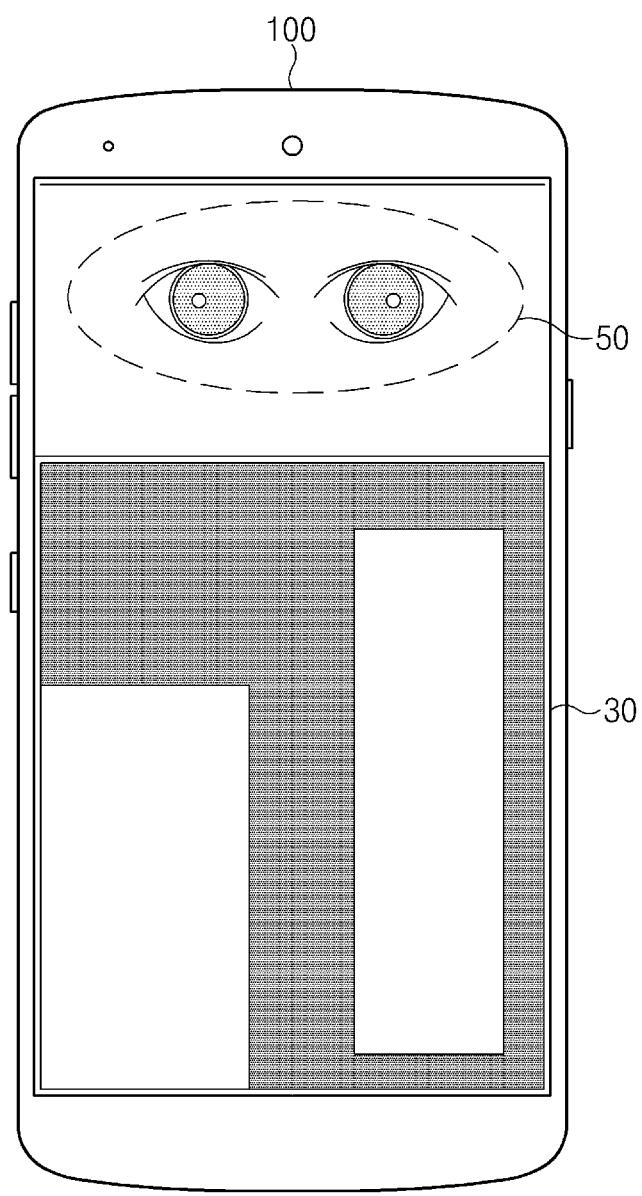
FIG. 12 is a diagram of an output shape of a graphical user interface during a user authentication operation of an electronic device, according to an embodiment.

FIG. 11 is a diagram of an output shape of a graphical user interface for orientation of an electronic device, according to an embodiment. FIG. 12 is a diagram of an output shape of a graphical user interface during a user authentication operation of an electronic device, according to an embodiment.

Referring to FIG. 11, the processor 150 of FIG. 3 of the electronic device 100 (e.g., the electronic device 1001 of FIG. 1) may determine the display form of the graphical user interface 30 based on the orientation (e.g., portrait or landscape) of the electronic device 100. For example, when the electronic device 100 is mounted on the mediation device 300 in FIG. 2 in a first orientation (e.g., landscape), the processor 150 may output the graphical user interface 30 to correspond to all active regions of the display 110 of FIG. 2 of the electronic device 100. Alternatively, when the orientation of the electronic device 100 is changed to a second orientation (e.g., portrait), the processor 150 may reduce the graphical user interface 30 in the central region of the active region of the electronic device 100, based on the first orientation and the second orientation.

Referring to FIG. 12, in a state where the electronic device 100 and the external display device 200 are connected to each other, user authentication (e.g., iris authentication) through the electronic device 100 may be required. For example, in an operation in which the screen of the display 210 of the external display device 200 is controlled based on the user input applied on the electronic device 100, a specific application (e.g., an electronic payment application or a mobile banking application) accompanied by the user authentication may be executed. In this case, the processor 150 of the electronic device 100 may display content 50 (e.g., an image guiding the relative location between the user's eye and the electronic device 100 with regard to iris authentication) associated with the user authentication in the upper region of the display 110 of FIG. 2 based on the second orientation (e.g., portrait) of the electronic device 100 and may display the graphical user interface 30 below the content 50.

According to various embodiments described above, an electronic device may include a housing, a touchscreen display exposed through a first region of the housing, a wireless communication circuit, an electrical connector exposed through a second region of the housing, a processor electrically connected to the touchscreen display, the wireless communication circuit, and the connector, and a memory electrically connected to the processor.

According to various embodiments, the memory may store instructions, when executed by the processor, cause the electronic device, in a first operation in which the electronic device is not connected to an external display device, to display a first screen including a plurality of icons associated with a plurality of application programs, on the display in a first format, and in a second operation in which the electronic device is connected to the external display device via the connector, to render a second screen including the plurality of icons, in a second format, to provide data associated with the second screen to the external display device via the connector such that the external display device displays the second screen, to display a graphical user interface indicative of at least one object included in the second screen, on the display, to receive a user input via the display, to determine first coordinates of the user input, and to adapt the first coordinates to the second screen so as to correspond to second coordinates corresponding to at least one region of the external display device.

According to various embodiments, the graphic user interface may include at least one region in which the object is positioned.

According to various embodiments, the graphic user interface may include at least one guide line.

According to various embodiments, the guide line may indicate an application region range of the user input for controlling the second screen that the external display device displays.

According to various embodiments, the graphical user interface may include a black background in at least part of a region.

According to various embodiments, the instructions, when executed by the processor, may further cause the electronic device to display the graphical user interface, when receiving the user input using a stylus pen.

According to various embodiments, the electronic device may further include a recess formed in the housing and a stylus pen detachably inserted into the recess.

According to various embodiments, the instructions, when executed by the processor, may further cause the electronic device to make determination of whether the stylus pen is inserted into the recess and to display the graphical user interface based at least partly on the determination.

According to various embodiments, the instructions, when executed by the processor, may further cause the electronic device to display the graphical user interface, when approach of the stylus pen to the electronic device is detected within a specified distance.

According to various embodiments described above, an electronic device may include a housing, a touchscreen display, at least part of which is exposed through a first region of the housing, a wireless communication circuit, a connector, at least part of which is exposed through a second region of the housing, and a processor electrically connected to the touchscreen display, the wireless communication circuit, and the connector.

According to various embodiments, the processor may be configured to connect to an external display device via the wireless communication circuit or the connector, to display a graphical user interface corresponding to a screen, which the external display device outputs, in at least part of a region of the touchscreen display, to display at least part of a region of the graphical user interface in a black background, and to convert first coordinate information of a user input, which is received with respect to at least one region of the graphical user interface, to second coordinate information corresponding to the external display device to transmit the second coordinate information to the external display device.

According to various embodiments, the processor may be configured to interrupt a display of the graphical user interface, after displaying the graphical user interface, when receiving the user input to the touchscreen display within a specified time range.

According to various embodiments, the processor may be configured to interrupt a display of the graphical user interface within a specified time from a time at which the user input is received, after displaying the graphical user interface, when receiving the user input to the touchscreen display.

According to various embodiments, the electronic device may further include a memory configured to store at least one application program.

According to various embodiments, the processor may be configured to store information associated with at least one application program, in which a resizing of an execution screen is supported in the external display device, from among the at least one application program in the memory as a database.

According to various embodiments, the processor may be configured to collect data for a screen, which is being output via the touchscreen display, at a time at which the external display device is connected.

According to various embodiments, the processor may be configured to interrupt a display of the graphical user interface, when receiving the user input via an external input device connected to the electronic device.

According to various embodiments, the processor may be configured to include at least one guide region corresponding to at least one of a window or an interface included in a screen, which the external display device outputs, in at least one region of the graphical user interface.

According to various embodiments described above, a user input supporting method of an electronic device may include connecting to an external display device, displaying a graphical user interface corresponding to a screen, which the external display device outputs, in at least part of a region of touchscreen display that the electronic device includes, displaying at least part of a region of the graphical user interface in a black background, converting first coordinate information of a user input, which is received with respect to at least one region of the graphical user interface, to second coordinate information corresponding to the external display device to transmit the second coordinate information to the external display device.

According to various embodiments, displaying of the graphical user interface may include including a guide line indicative of an application region range of the user input for controlling a screen, which the external display device displays, in an edge region of the graphical user interface.

According to various embodiments, displaying of the graphical user interface may include including at least one guide region corresponding to at least one of a window or an interface included in a screen, which the external display device displays, in at least one region of the graphical user interface.

According to various embodiments, displaying of the graphical user interface may include displaying the graphical user interface, when at least one of detachment of a stylus pen detachably mounted in the electronic device or approach of the stylus pen to the electronic device within a specified distance is detected.

According to various embodiments, displaying of the graphical user interface may include interrupting a display of the graphical user interface within a specified time from a time at which the user input is received, after displaying the graphical user interface, when receiving the user input to the touchscreen display.

According to various embodiments, the user is allowed to intuitively recognize the region of the user input associated with the screen control of an external display device, by providing a graphical user interface corresponding to the screen of the external display device on the display of an electronic device.

According to various embodiments, the clarity of the user input to control the screen of the external display device may be improved.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:
1. An electronic device, comprising:
a housing;
a touchscreen display exposed through a first region of the housing;
a wireless communication circuit;
an electrical connector exposed through a second region of the housing;
a processor electrically connected to the touchscreen display, the wireless communication circuit, and the connector; and
a memory electrically connected to the processor,
wherein the memory stores instructions, when executed by the processor, cause the electronic device to:
in a first operation in which the electronic device is not connected to an external display device:
display a first screen including a plurality of icons associated with a plurality of application programs, on the display in a first format; and
in a second operation in which the electronic device is connected to the external display device via the connector:
render a second screen including the plurality of icons, in a second format;
provide data associated with the second screen to the external display device via the connector such that the external display device displays the second screen;
display a guide region mapped to a window on the second screen displayed on the external display device, wherein the guide region is configured to be mapped to the window at a specified ratio corresponding to a resolution ratio between the touchscreen display and a display of the external display device;
receive a user input on the guide region via the touchscreen display;
determine first coordinates of the user input; and
adapt the first coordinates to the second screen so as to correspond to second coordinates corresponding to the second screen of the external display device such that the user input received on the guide region is applied to the window, wherein the application of the user input includes selecting an icon corresponding to the second coordinates from among the plurality of icons.

2. The electronic device of claim 1, wherein the guide region includes at least one region in which an object included in the second screen is positioned.

3. The electronic device of claim 1, wherein the guide region includes at least one guide line.

4. The electronic device of claim 3, wherein the guide line indicates an application region range of the user input for controlling the second screen that the external display device displays.

5. The electronic device of claim 1, wherein the guide region includes a black background in at least part of a region.

6. The electronic device of claim 1, wherein the instructions, when executed by the processor, further cause the electronic device to:
when receiving the user input using a stylus pen, display the guide region.

7. The electronic device of claim 1, further comprising:
a recess formed in the housing; and
a stylus pen detachably inserted into the recess,
wherein the instructions, when executed by the processor, further cause the electronic device to:
make determination of whether the stylus pen is inserted into the recess; and
display the guide region based at least partly on the determination.

8. The electronic device of claim 7, wherein the instructions, when executed by the processor, further cause the electronic device to:
when approach of the stylus pen to the electronic device is detected within a specified distance, display the guide region.

9. An electronic device, comprising:
a housing;
a touchscreen display, at least part of which is exposed through a first region of the housing;
a wireless communication circuit;
a connector, at least part of which is exposed through a second region of the housing; and
a processor electrically connected to the touchscreen display, the wireless communication circuit, and the connector,
wherein the processor is configured to:
connect to an external display device via the wireless communication circuit or the connector;
display a guide region mapped to a window on the second screen displayed on the external display device, wherein the guide region is configured to be mapped to the window at a specified ratio corresponding to a resolution ratio between the touchscreen display and a display of the external display device;
display the guide region in a black background; and
convert first coordinate information of a user input, which is received with respect to the guide region, to second coordinate information corresponding to the external display device to transmit the second coordinate information to the external display device, such that the user input received with respect to the guide region is applied to the window, wherein the application of the user input includes selecting an icon corresponding to the second coordinate information from among a plurality of icons included in the second screen.

10. The electronic device of claim 9, wherein the processor is further configured to:
after displaying the guide region, when receiving the user input to the touchscreen display within a specified time range, interrupt a display of the guide region.

11. The electronic device of claim 9, wherein the processor is further configured to:
after displaying the guide region, when receiving the user input to the touchscreen display, interrupt a display of the guide region within a specified time from a time at which the user input is received.

12. The electronic device of claim 9, further comprising:
a memory configured to store at least one application program,
wherein the processor is further configured to:
store information associated with at least one application program, in which a resizing of an execution screen is supported in the external display device, from among the at least one application program in the memory as a database.

13. The electronic device of claim 9, wherein the processor is further configured to:
collect data for a screen, which is being output via the touchscreen display, at a time at which the external display device is connected.

14. The electronic device of claim 9, wherein the processor is further configured to:
when receiving the user input via an external input device connected to the electronic device, interrupt a display of the guide region.

15. The electronic device of claim 9, wherein the processor is further configured to:
include at least one guide region corresponding to an interface included in a screen, which the external display device outputs, in the guide region.

16. A user input supporting method of an electronic device, the method comprising:
connecting to an external display device;
displaying, on a display of the electronic device, a guide region mapped to a window on the second screen displayed on the external display device, wherein the guide region is configured to be mapped to the window at a specified ratio corresponding to a resolution ratio between the display of the electronic device and a display of the external display device;
displaying the guide region in a black background; and
converting first coordinate information of a user input, which is received with respect to the guide region, to second coordinate information corresponding to the external display device to transmit the second coordinate information to the external display device, such that the user input received with respect the guide region is applied to the window,
wherein the application of the user input includes selecting an icon corresponding to the second coordinate information from among a plurality of icons included in the second screen.

17. The method of claim 16, wherein displaying the guide region includes:
including a guide line indicative of an application region range of the user input for controlling a screen, which the external display device displays, in an edge region of the guide region.

18. The method of claim 16, wherein displaying the guide region includes:

including at least one guide region corresponding to at least one of a window or an interface included in a screen, which the external display device displays, in at least one region of the guide region.

19. The method of claim 16, wherein displaying the guide region includes:

when at least one of detachment of a stylus pen detachably mounted in the electronic device or approach of the stylus pen to the electronic device within a specified distance is detected, displaying the guide region.

20. The method of claim 16, wherein displaying the guide region includes:

after displaying the guide region, when receiving the user input to the display of the electronic device, interrupting a display of the guide region within a specified time from a time at which the user input is received.

* * * * *